(12) United States Patent
Ge et al.

(10) Patent No.: US 11,398,337 B2
(45) Date of Patent: Jul. 26, 2022

(54) AUTOMOTIVE VARIABLE VOLTAGE CONVERTER WITH INDUCTOR HAVING DIAGONAL AIR GAP

(71) Applicant: Ford Global Technologies, LLC, Dearborn, MI (US)

(72) Inventors: Baoming Ge, Okemos, MI (US); Lihua Chen, Farmington Hills, MI (US); Serdar Hakki Yonak, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/008,023

(22) Filed: Aug. 31, 2020

(65) Prior Publication Data

US 2022/0068542 A1    Mar. 3, 2022

(51) Int. Cl.
*H01F 27/24* (2006.01)
*B60L 53/20* (2019.01)
*H01F 27/28* (2006.01)

(52) U.S. Cl.
CPC .............. *H01F 27/24* (2013.01); *B60L 53/20* (2019.02); *H01F 27/28* (2013.01); *B60L 2210/40* (2013.01)

(58) Field of Classification Search
CPC .......... H01F 27/24; H01F 27/28; H01F 27/38; H01F 3/14; H01F 3/00; B60L 53/20; B60L 2210/40; B60L 50/51; H02M 7/003; H02M 7/537; H02P 27/06
See application file for complete search history.

(56) References Cited

U.S. PATENT DOCUMENTS

| | | | |
|---|---|---|---|
| 6,445,270 B1 * | 9/2002 | Ogasawara | H01F 38/14 336/182 |
| 6,583,701 B2 | 6/2003 | Sun et al. | |
| 8,466,766 B2 | 6/2013 | Carsten | |
| 2016/0236579 A1 * | 8/2016 | Yim | H02J 7/02 |

FOREIGN PATENT DOCUMENTS

CN      1236176 A      11/1999

* cited by examiner

*Primary Examiner* — Lincoln D Donovan
*Assistant Examiner* — Alex W Lam
(74) *Attorney, Agent, or Firm* — David B. Kelley; Brooks Kushman P.C.

(57) ABSTRACT

An inductor includes a pair of core portions having tapered legs and windings wound around the tapered legs. Each of the core portions are arranged adjacent to each other such that the tapered legs define a gap between the core portions that extends diagonally from one end of the inductor towards another end of the inductor relative to outer surfaces of the inductor.

13 Claims, 5 Drawing Sheets

AUTOMOTIVE VARIABLE VOLTAGE CONVERTER WITH INDUCTOR HAVING DIAGONAL AIR GAP

TECHNICAL FIELD

This disclosure relates to automotive power electronics components.

BACKGROUND

An electrified vehicle may contain one or more electric machines for propulsion, and a traction battery to provide energy for the electric machines. As the electric machines and traction battery may require differing electrical parameters, electrical communication between them may require modification of the power provided or consumed.

SUMMARY

An automotive vehicle includes a traction battery, an electric machine, and a variable voltage converter. The variable voltage converter transfers power between the traction battery and electric machine. The variable voltage converter has an inductor including a core that has a pair of U-shaped portions each having a sloped surface and arranged such that the sloped surfaces are adjacent to and spaced away from each other to define a gap that extends diagonally from one end of the core towards another end of the core. Each of the U-shaped portions may include a base and legs. The legs may define the sloped surface. A thickness of the base may be greater than a thickness of ends of the legs opposite the base. Each of the U-shaped portions may include tapered legs. The U-shaped portions may be same.

An automotive power converter includes a pair of series connected switches and an inductor. The inductor includes a pair of core portions having tapered legs, windings wound around the tapered legs, and a terminal center tapping the switches. The core portions are arranged adjacent to each other such that the tapered legs define a gap between the core portions that extends diagonally from one end of the inductor towards another end of the inductor relative to outer surfaces of the inductor. The core portions may be U-shaped. The tapered legs may have sloped surfaces that are arranged adjacent to and spaced away from each other. An angle between the gap and one of the outer surfaces may be less than 45°. Each of core portions may further have a base. A thickness of the base may be greater than a thickness of an end of the tapered legs opposite the base. The core portions may be same.

An inductor includes a core and windings wound around the core. The core includes a pair of U-shaped portions each having a sloped surface and arranged such that the sloped surfaces are adjacent to and spaced away from each other to define a gap that extends diagonally from one end of the core towards another end of the core.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
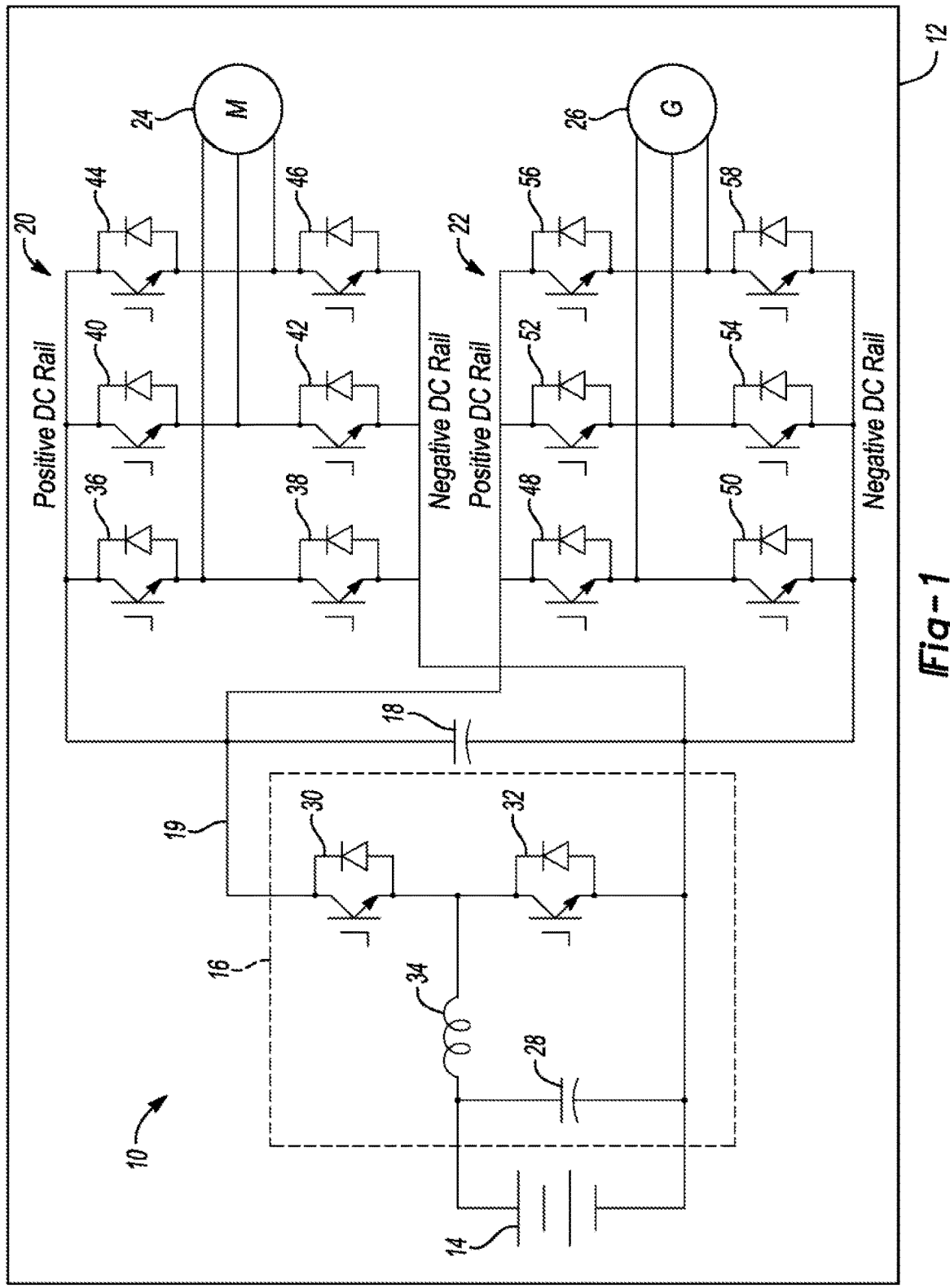
FIG. 1 is a schematic diagram of an electric drive system.

Power electronics converters/inverters have been extensively used in hybrid electric vehicle and electric vehicle drive systems. As shown in FIG. 1, an electric drive system 10 for a vehicle 12 includes a traction battery 14, a variable voltage converter 16, a DC-link capacitor 18 for DC bus 19, two power converters (DC-AC inverters) 20, 22, a motor 24, and a generator 26. The variable voltage converter 16 includes a capacitor 28 in parallel with the traction battery 14, a pair of series connected switches 30, 32 (e.g., transistors), and a power inductor 34 between the capacitor and series connected switches 30, 32. A terminal of the power inductor 34 center taps the series connected switches 30, 32.

The DC-AC inverter 20 includes, in this example, three pairs of series connected switches 36, 38, 40, 42, 44, 46. Each of the pairs defines a corresponding phase leg for the motor 24. The DC-AC inverter 22 also includes three pairs of series connected switches 48, 50, 52, 54, 56, 58. Each of the pairs defines a corresponding phase leg for the motor generator 26. The switches 36, 38, 40, 42, 44, 46, 48, 50, 52, 54, 56, 58 can be insulated gate bipolar transistors (IGBTs), metal oxide semiconductor field effect transistors (MOSFETs), or other controllable semiconductor devices. In the following examples, the switches 36, 38, 40, 42, 44, 46, 48, 50, 52, 54, 56, 58 are shown to be IGBTs.

A voltage associated with power from the traction battery 14 may be increased by operation of the variable voltage converter 16 for eventual delivery to the DC-AC inverter 20 and thus the motor 24 to propel the vehicle 12. Likewise, regenerative power captured by the generator 26 may be passed through the DC-AC inverter 22 and so on for storage in the traction battery 14.

Figure 2:
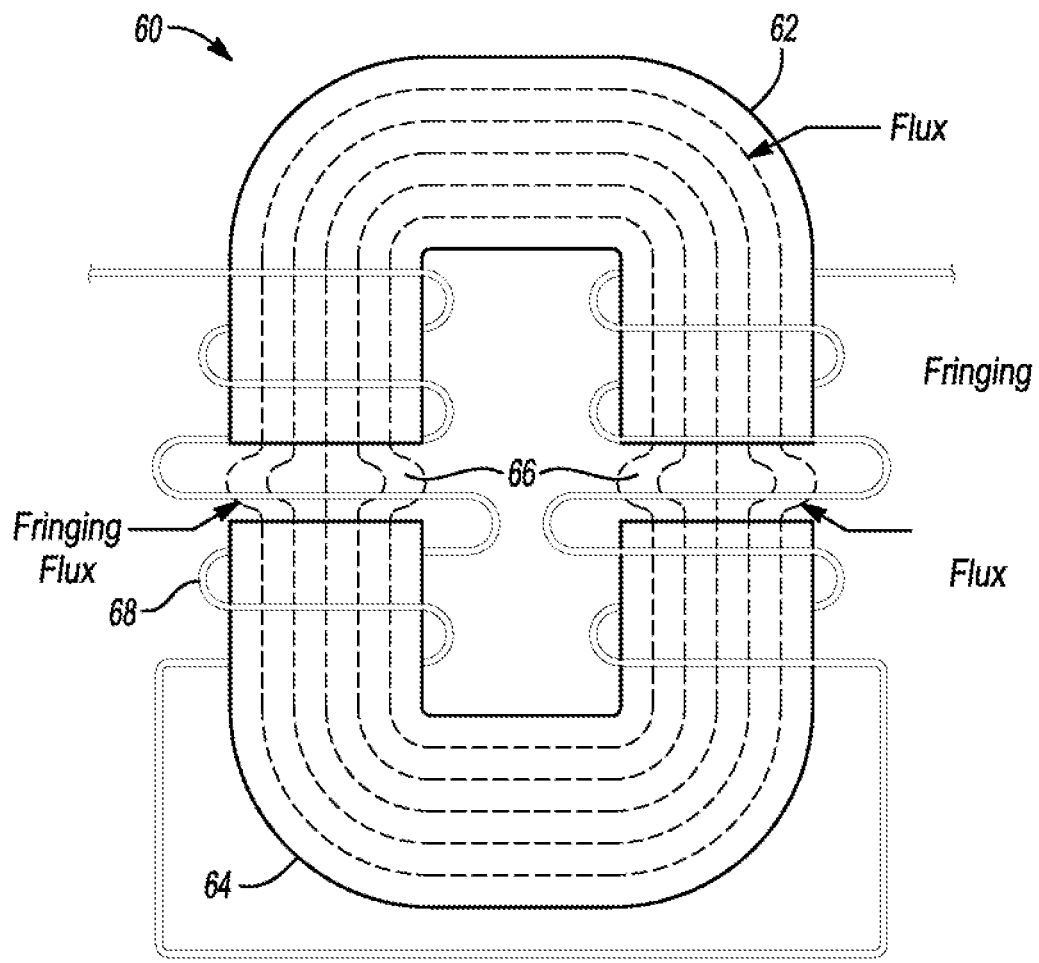
FIG. 2 is a plan view of a conventional inductor.

FIG. 2 shows a conventional power inductor 60 that can be used by a variable voltage converter, such as the variable voltage converter 16 of FIG. 1. It includes a pair of U-shaped cores 62, 64 arranged to define an air gap 66 therebetween and a coil 68 wound around the U-shaped cores 62, 64. High current capability of the power inductor 60 typically requires the air gap 66 to be large, which may impact inductance at low current. Moreover, presence of the air gap 66 causes concentrated fringing flux between the U-shaped cores 62, 64, which can result in high copper AC loss and localized heat variations (e.g., hot spots). A powder core with low permeability may instead be used to eliminate the air gap 66 and the corresponding fringing flux and copper AC loss. Such power inductors, however, are generally larger and heavier than their air gapped counterparts. Alternatively, air gap reluctance can be changed to adjust inductance, but a change in air gap cross sectional area will directly impact core cross sectional area, which may increase core and winding material—increasing cost and weight.

Here, power inductors are proposed with air gaps extending diagonally along the core to distribute the fringing flux more evenly and reduce associated copper AC loss. The air gaps are no longer cuboid with sides being perpendicular to the magnetic flux direction as in FIG. 2. Rather, they may be rhombohedron with no sides being perpendicular to the magnetic flux direction. These power inductors may allow more flexibility to design with less copper and less core material, which can lower inductor weight and cost. They may be used within the context of a variable voltage converter, such as the variable voltage converter 16 of FIG. 1.

Figure 3:
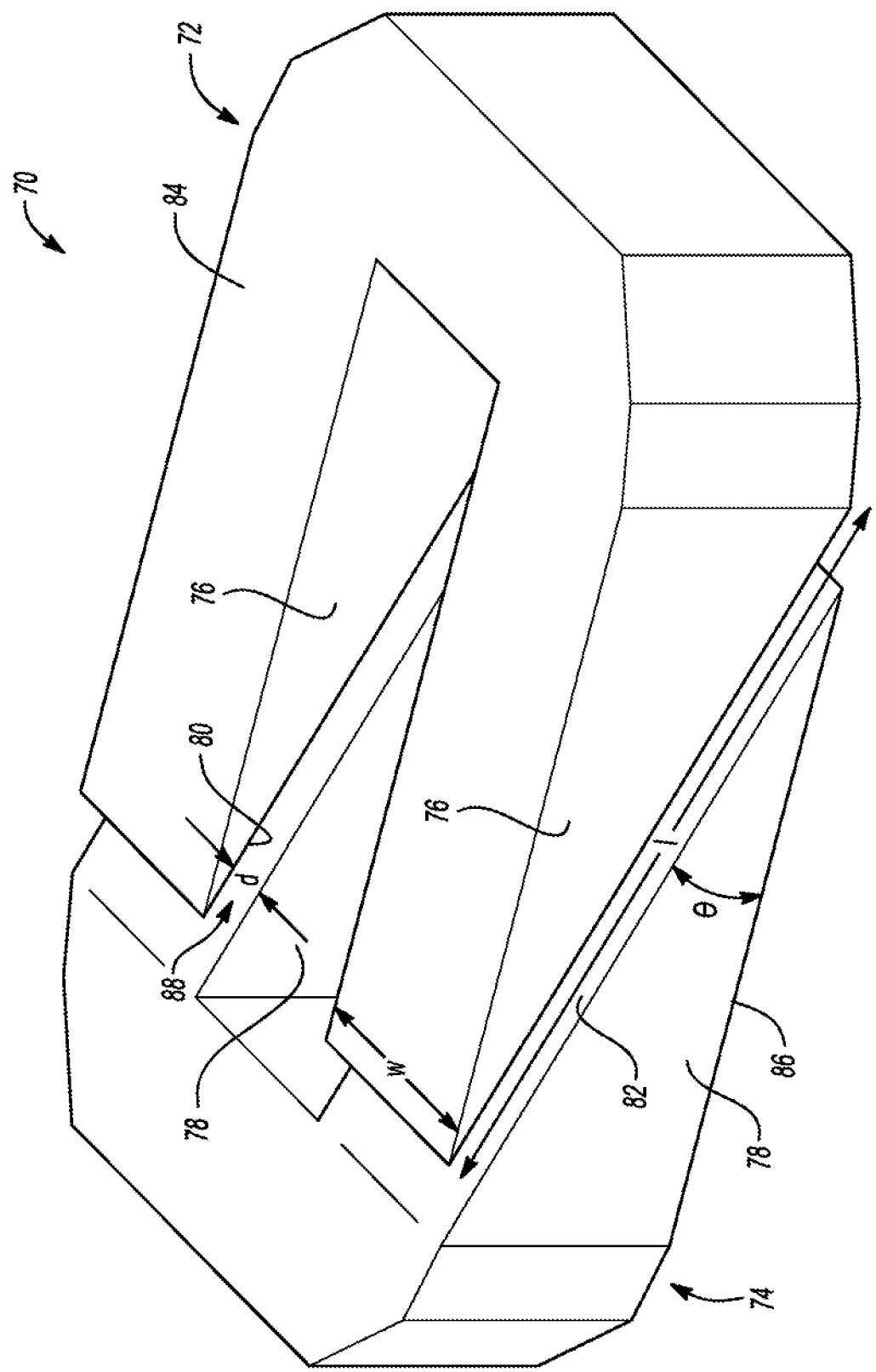
FIG. 3 is a perspective view of an inductor core with air gaps extending diagonally there across.

FIG. 3 shows a portion of a power conductor 70 that includes a pair of U-shaped cores 72, 74. The U-shaped core 72 has a pair of legs 76, and the U-shaped core 74 has a pair of legs 78. Unlike the U-shaped cores 62, 64 of FIG. 2, the legs 76, 78 have a wedge-like appearance. Thus, the legs 76, 78 have sloped surfaces 80, 82 respectively and outer surfaces 84, 86 respectively. For each of the U-shaped cores 72, 74, a base connects the legs 76, 78 respectively.

For purposes of further discussion, the sloped surfaces 80, 82 define an angle designated as "θ" relative to the outer surfaces 84, 86 respectively, a length of the sloped surfaces 80, 82 is designated as "l," and a width of the sloped surfaces 80, 82 is designated as "w." The U-shaped cores 72, 74 are arranged such that the sloped surfaces 80, 82 are adjacent to, and spaced away from, each other by a distance designated as "d" to define an air gap 88 that diagonally extends from one end of the power conductor 70 to the other.

Figure 4B:
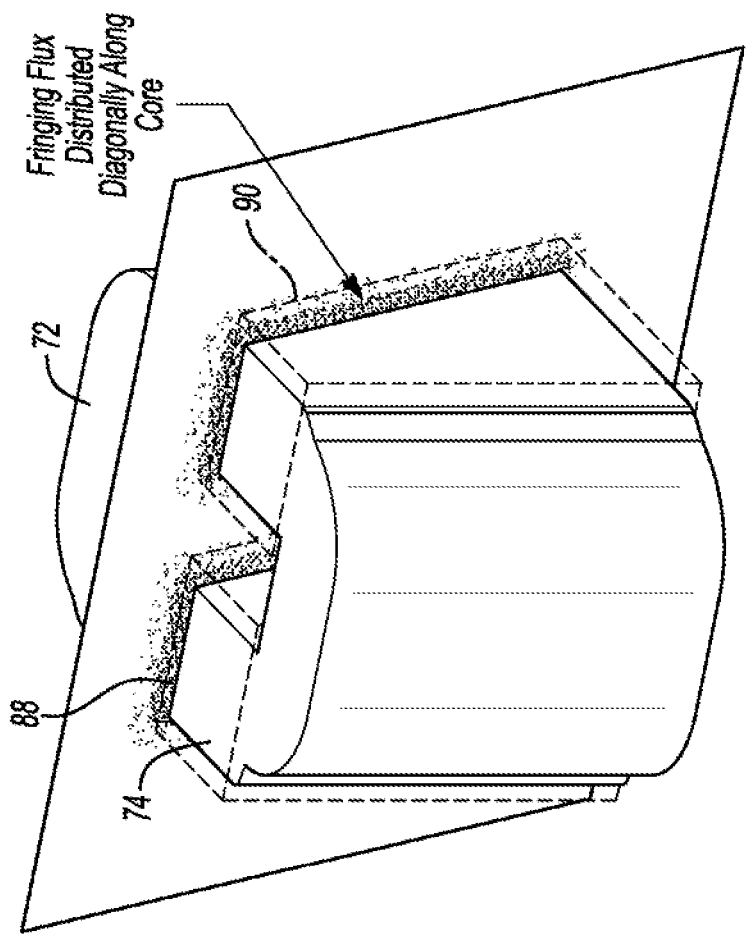
FIGS. 4A and 4B are perspective views of the cores of FIGS. 2 and 3 respectively.
Figure 4A:
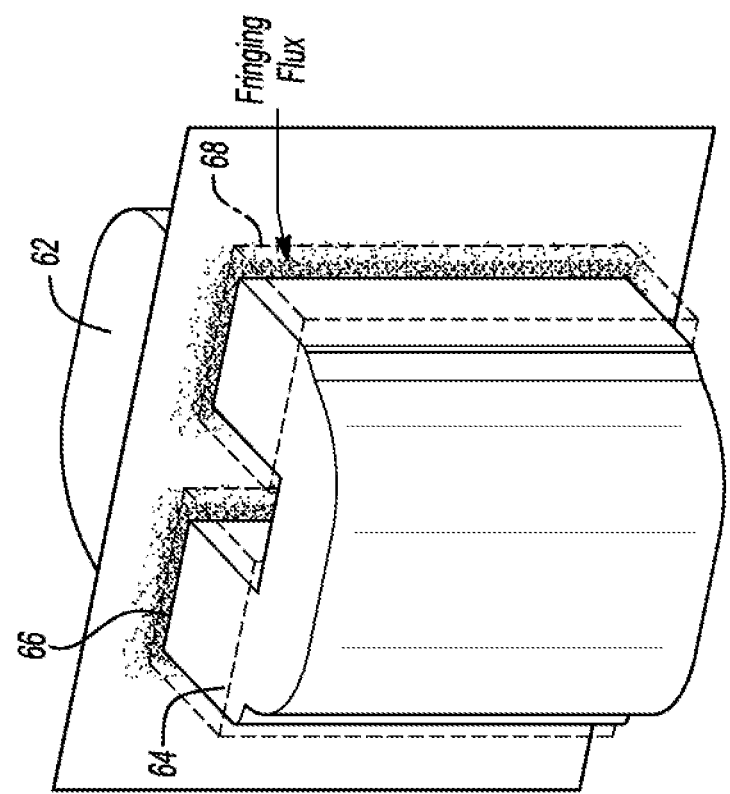

FIGS. 4A and 4B show the distribution of the fringing flux for the U-shaped cores 62, 64 and the coil 68, and the U-shaped cores 72, 74 and coil 90 respectively. In the arrangement of FIG. 4A, the fringing flux is concentrated at a certain location of the coil 68 along the U-shaped cores 62, 64. In the arrangement of FIG. 4B, the fringing flux is more evenly distributed across the coil 90 along the U-shaped cores 72, 74. Copper AC loss and localized temperature variations are thus reduced as each turn of the coil 90 has only a portion exposed to a portion of the air gap.

The proposed diagonal air gapped inductors may provide more freedom for optimization as compared with existing inductors. Air gap cross sectional area is decoupled from the core cross sectional area: Changing air gap cross sectional area does not affect the core cross sectional area. As a result, inductor design may be more flexible. Less copper and less core material can be used, which will lower inductor weight and cost.

Figure 5:
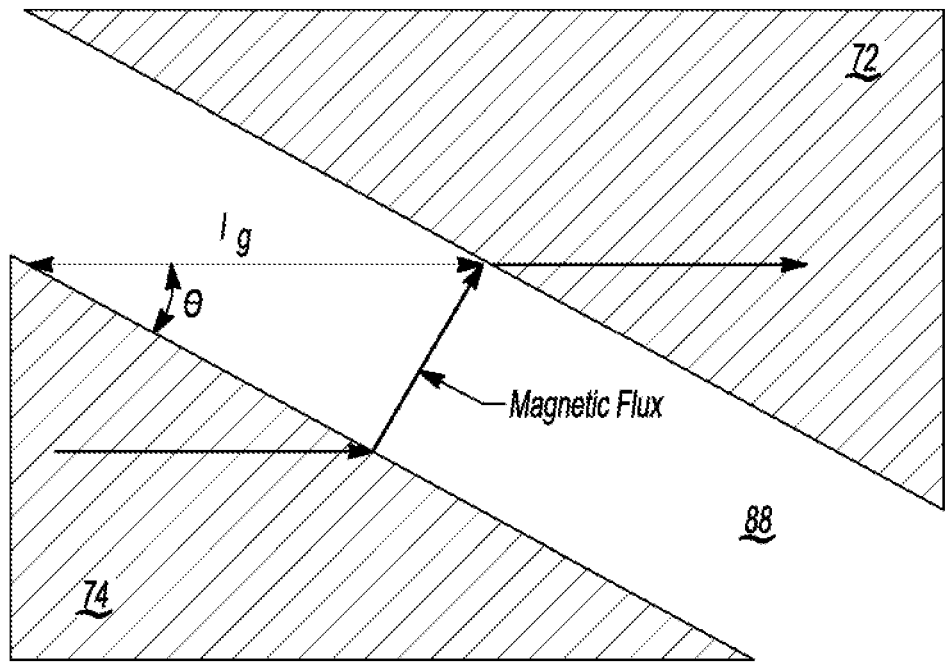
FIG. 5 is a side view of a portion of the air gap and U-shaped cores of FIG. 3.

With reference to FIGS. 3 and 5, the cross-sectional area, A, of the air gap 88 is $$A = l \cdot w$$

As apparent to those of ordinary skill, the air gap shape increases the cross sectional area of the air gap 88. Inductance can therefore be increased without changing the core cross sectional area. Inductance, L, for example can be approximated by $$L = (N^2 \cdot A \cdot \mu)/(2 \cdot l_g \cdot \sin\theta)$$

where N is the turns number of the coil 90, μ is the permeability of the air gap 88, and $l_g$ is the width of the air gap 88 as measured parallel to the outer surfaces 84, 86. For a given N, A, μ, and $l_g$, L is minimized when θ is 90°, as is the case in FIG. 2.

Inductor examples were analyzed using standard tools. The arrangements of FIGS. 4A and 4B were examined each with a ferrite core, N=46, and $l_g$=5 mm. For the arrangement of FIG. 4A, θ=90°. For the arrangement of FIG. 4B, θ=28.55°. Through ANSYS-based calculation, the arrangement of FIG. 4A yields a 197.8 μH inductance, while the arrangement of FIG. 4B yields a 657.4 μH inductance. Reducing N of FIG. 4B to 26 (from 46) yields a 210 μH inductance: A 43.5% copper reduction.

Figure 6:
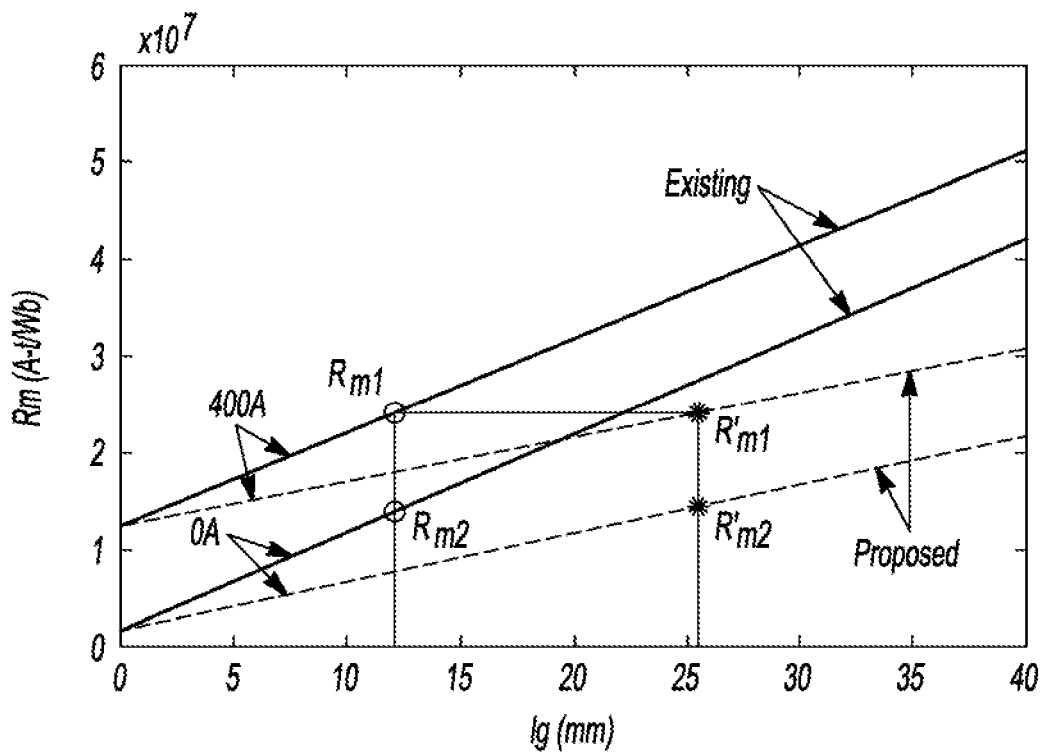
FIG. 6 is a plot of reluctance versus air gap size for conventional and proposed inductors.

The following comparison further illustrates performance differences between existing arrangements (e.g., see FIG. 4A) and proposed arrangements (e.g., see FIG. 4B). To simplify the comparison, certain assumptions were made: 1) both have the same turns number; 2) both have the same length of total magnetic path including core and air gap; 3) both have the same core cross sectional area; 4) both have the same winding window; 5) both have the same inductance at 400 A; and 6) θ is 45° for the proposed arrangements. FIG. 6 shows reluctance curves versus air gap length for the existing and proposed arrangements, where Rm is the sum of core reluctance and air gap reluctance. $R_{m1}=R'_{m1}$ at 400 A, which indicates that two arrangements have the same inductance at 400 A, but the proposed arrangement has a 25.4 mm air gap whereas the existing arrangement has a 12 mm air gap. The proposed arrangement yields an approximate 80 gram core weight reduction compared to the existing arrangement. For θ less than 45°, there will be more core weight reduction. When inductor current is low, the reluctances of the two are close, e.g., $R_{m2}=R'_{m2}$, which means the inductances are close.

The words used in the specification are words of description rather than limitation, and it is understood that various changes may be made without departing from the spirit and scope of the disclosure and claims.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive vehicle comprising:
   a traction battery;
   an electric machine; and
   a variable voltage converter configured to transfer power between the traction battery and electric machine, wherein the variable voltage converter has an inductor including a core that has a pair of U-shaped portions each having a sloped surface and including a base and legs, wherein the pair are arranged such that the sloped surfaces are adjacent to and spaced away from each other to define a gap that extends diagonally from one end of the core towards another end of the core and wherein a thickness of the base is greater than a thickness of ends of the legs opposite the base.

2. The automotive vehicle of claim 1, wherein the legs define the sloped surface.

3. The automotive vehicle of claim 1, wherein each of the U-shaped portions includes tapered legs.

4. The automotive vehicle of claim 1, wherein the U-shaped portions are same.

5. An automotive power converter comprising:

a pair of series connected switches; and an inductor including a pair of core portions each having tapered legs and a base, windings wound around the tapered legs, and a terminal center tapping the switches, wherein the core portions are arranged adjacent to each other such that the tapered legs define a gap between the core portions that extends diagonally from one end of the inductor towards another end of the inductor relative to outer surfaces of the inductor and wherein a thickness of the base is greater than a thickness of an end of the tapered legs opposite the base.

6. The automotive power converter of claim 5, wherein the core portions are U-shaped.

7. The automotive power converter of claim 5, wherein the tapered legs have sloped surfaces that are arranged adjacent to and spaced away from each other.

8. The automotive power converter of claim 7, wherein an angle between the gap and one of the outer surfaces is less than 45°.

9. The automotive power converter of claim 5, wherein the core portions are same.

10. An inductor comprising:

a core including a pair of U-shaped portions each (i) including a base and legs and (ii) having a sloped surface, wherein the pair are arranged such that the sloped surfaces are adjacent to and spaced away from each other to define a gap that extends diagonally from one end of the core towards another end of the core and wherein a thickness of the base is greater than a thickness of ends of the legs opposite the base; and windings wound around the core to encircle the gap.

11. The inductor of claim 10, wherein each of the U-shaped portions includes a base and legs, and wherein the legs define the sloped surface.

12. The inductor of claim 10, wherein each of the U-shaped portions includes tapered legs.

13. The inductor of claim 10, wherein the U-shaped portions are same.

* * * * *